US010744460B2

(12) United States Patent
Alam et al.

(10) Patent No.: US 10,744,460 B2
(45) Date of Patent: Aug. 18, 2020

(54) SUBSEA INSTALLATION AND METHOD FOR TREATMENT OF SEAWATER

(71) Applicant: VETCO GRAY SCANDINAVIA AS, Sandvika (NO)

(72) Inventors: Zamir Alam, Oakville (CA); Jose Luis Plasencia Cabanillas, Sandvika (NO); Asal Amiri, Sandvika (NO)

(73) Assignee: Vetco Gray Scandinavia AS, Sandvika (NO)

( * ) Notice: Subject to any disclaimer, the term of this patent is extended or adjusted under 35 U.S.C. 154(b) by 12 days.

(21) Appl. No.: 15/557,896

(22) PCT Filed: Mar. 11, 2016

(86) PCT No.: PCT/EP2016/055276
§ 371 (c)(1),
(2) Date: Sep. 13, 2017

(87) PCT Pub. No.: WO2016/146520
PCT Pub. Date: Sep. 22, 2016

(65) Prior Publication Data
US 2018/0071682 A1  Mar. 15, 2018

(30) Foreign Application Priority Data

Mar. 13, 2015  (NO) .................................. 20150328

(51) Int. Cl.
*B01D 61/02*  (2006.01)
*B01D 61/14*  (2006.01)
(Continued)

(52) U.S. Cl.
CPC ........... *B01D 61/02* (2013.01); *B01D 61/022* (2013.01); *B01D 61/08* (2013.01); *B01D 61/14* (2013.01);
(Continued)

(58) Field of Classification Search
CPC ............ B01D 2311/06; B01D 2311/25; B01D 2311/2661; B01D 2311/2684;
(Continued)

(56) References Cited

U.S. PATENT DOCUMENTS

| 2004/0055955 A1* | 3/2004 | Davis ..................... B01D 61/44 210/652 |
| 2011/0056876 A1 | 3/2011 | Ide et al. |

(Continued)

FOREIGN PATENT DOCUMENTS

| CN | 102786174 A | 11/2012 |
| JP | H10-5760 A | 1/1998 |

(Continued)

OTHER PUBLICATIONS

First Office Action and Search issued in connection with corresponding NO Application No. 20150328 dated Sep. 8, 2015.

(Continued)

*Primary Examiner* — John Kim
(74) *Attorney, Agent, or Firm* — Mintz Levin Cohn Ferris Glovsky and Popeo, P.C.

(57) ABSTRACT

A water treatment subsea installation and method are disclosed, adapted for scaling prevention and treatment of raw seawater into process water suitable for use in subsea hydrocarbon production. The water treatment installation comprises a seawater inlet to a primary filtration unit wherein a filtration membrane separates a receiving chamber from a permeate chamber having an outlet for treated water. A pump is installed in fluid flow communication with the treated water outlet, a recirculation loop feeding a portion of the treated water via a subsea electro-chlorinator back to the water stream upstream or downstream of the membrane of the primary filtration unit, and a secondary filtration unit is (Continued)

installed in the treated water stream between the primary filtration unit and the electro-chlorinator.

8 Claims, 2 Drawing Sheets

(51) Int. Cl.
| | |
|---|---|
| *B01D 61/08* | (2006.01) |
| *B01D 61/18* | (2006.01) |
| *B01D 61/58* | (2006.01) |
| *C02F 1/44* | (2006.01) |
| *C02F 1/467* | (2006.01) |
| *C02F 103/08* | (2006.01) |

(52) U.S. Cl.
CPC ............ *B01D 61/18* (2013.01); *B01D 61/58* (2013.01); *C02F 1/44* (2013.01); *C02F 1/441* (2013.01); *C02F 1/442* (2013.01); *C02F 1/444* (2013.01); *C02F 1/467* (2013.01); *C02F 1/4674* (2013.01); *B01D 61/025* (2013.01); *B01D 61/027* (2013.01); *B01D 61/145* (2013.01); *B01D 61/147* (2013.01); *B01D 2311/06* (2013.01); *B01D 2311/25* (2013.01); *B01D 2311/2661* (2013.01); *B01D 2311/2684* (2013.01); *B01D 2311/2692* (2013.01); *C02F 2103/08* (2013.01); *C02F 2301/046* (2013.01); *C02F 2303/22* (2013.01)

(58) Field of Classification Search
CPC ........ B01D 2311/04; B01D 2311/2692; B01D 61/02; B01D 61/022; B01D 61/025; B01D 61/027; B01D 61/08; B01D 61/14; B01D 61/145; B01D 61/147; B01D 61/18; B01D 61/58; C02F 1/44; C02F 1/441; C02F 1/442; C02F 1/444; C02F 1/467; C02F 1/4674; C02F 2103/08; C02F 2301/046; C02F 2303/22
See application file for complete search history.

(56) References Cited

U.S. PATENT DOCUMENTS

| | | |
|---|---|---|
| 2013/0032533 A1 | 2/2013 | Libman et al. |
| 2014/0290484 A1 | 10/2014 | Weston et al. |

FOREIGN PATENT DOCUMENTS

| | | |
|---|---|---|
| NO | 20101192 A1 | 2/2012 |
| WO | 2005/119007 A1 | 12/2005 |
| WO | 2011/051666 A1 | 5/2011 |

OTHER PUBLICATIONS

International Search Report and Written Opinion issued in connection with corresponding PCT Application No. PCT/EP2016/055276 dated May 19, 2016.
Second Office Action issued in connection with corresponding NO Application No. 20150328 dated May 25, 2016.
Third Office Action issued in connection with corresponding NO Application No. 20150328 dated Nov. 28, 2016.
International Preliminary Report on Patentability issued in connection with corresponding PCT Application No. PCT/EP2016/055276 dated Sep. 19, 2017.

* cited by examiner

SUBSEA INSTALLATION AND METHOD FOR TREATMENT OF SEAWATER

TECHNICAL FIELD OF THE INVENTION

The present invention relates to subsea water treatment installations and methods directed to the refinement of raw seawater into process water suitable for use in subsea hydrocarbon production.

BACKGROUND OF THE INVENTION

Water can be used for different purposes in the process of recovery of hydrocarbon products from a subsea hydrocarbon deposit. One principal use of water in subsea hydrocarbon production is the pumping of water down into water injection wells that are formed in a subterranean hydrocarbon reservoir. Injection of water is a commonly used method for increasing the degree of recovery of crude oil from a subsea deposit. If injection water is taken from seawater the raw water needs to be removed from constituents which may otherwise harm the process equipment or lead to souring and/or fouling of the reservoir ground structure. Production of injection water from seawater therefore typically involves removal of solid particles suspended in the water, removal of dissolved inorganic material such as salts and sulphates or inhibition of organic material/organisms such as bacteria, etc. The process conventionally includes filtration through semipermeable filter membranes, and may additionally include the supply of chemicals such as chlorine or biocide and chemical corrosion or scaling inhibitors, e.g. to the treated water.

In this context two types of filters are usually employed—the dead end filter type and the cross-flow filter type.

In a dead end filter the supplied fluid, i.e. water in this case, is forced towards an upstream face of a semi-permeable membrane. The water that passes the membrane, named as permeate, is removed from organic and inorganic matter which is retained on the upstream side of the membrane, the retained matter named as retentate. A dead end filter generally comprises a membrane in the form of a metal or synthetic wire mesh having a suitable mesh size and filter depth. A filter cake of retentate matter is successively formed on the upstream side of the membrane, eventually covering the openings or channels through the membrane which then calls for replacement. The dead-end filter is relatively non-complex in structure and therefor comparatively cheap. A frequent replacement of filters is thus acceptable, at least in topside applications where filters are readily accessible for easy replacement.

Subsea applications often require equipment with a longer service life. In this aspect the cross-flow filter type can be designed with a comparatively large filter area in relation to its overall dimensions and may therefore be better suited for subsea use. The cross-flow filter designs include spiral wound membranes, tubular or straw membranes and hollow fibre membranes, e.g.

In the cross-flow filter the supplied water is conducted along an upstream side of a semi-permeable membrane. In result of the pressure applied, water is forced through the membrane to a downstream side from where the water is discharged as a permeate flow, relieved of organic and inorganic matter which is retained on the upstream side of the membrane. The retained matter is conducted away from the upstream side of the membrane and is discharged as a retentate flow.

Cross-flow filtration is often used for removal of smaller or very small components in the supplied water, including removal of dissolved components such as salts and sulphates.

In subsea applications and seawater treatment technology filters are generally applied in connection with coarse filtration, microfiltration, ultrafiltration, nano filtration and reverse osmosis filtration. Each of these grades of filtration successively removes smaller components from the supplied water from a particle size in the order of microns with reference to the micro- or ultrafiltration membranes down to particle sizes at ionic level with reference to the nanofiltration or reverse osmosis membranes.

In this connection it serves to be pointed out that an ultra filtration unit can be realized in the form of a tubular membrane in which water is forced through the fiber walls and the matter/solids are retained in one side. In nano filtration units and reverse osmosis units water flows parallel to membrane walls. Due to the high pressure, part of the flow permeates through the membrane walls to get the desired quality water while still a significant amount of reject that did not go through the membrane (richer in ionic content) flows out as a reject stream.

In the production of injection water from seawater, inhibition of bacterial growth may involve the generation of chlorine by electro-chlorination. In electro-chlorination energy is supplied to sodium chloride (NaCl) that is dissolved in seawater which passes through an electric field, resulting in sodium hypochlorite (NaOCl) and hydrogen gas ($H_2$). The sodium hypochlorite is a good alternative for seawater disinfection because its production can be made subsea using an electro-chlorinator.

Electro-chlorination of raw seawater may however also cause problems in terms of scaling caused by precipitation of calcium carbonate ($CaCO_3$) and magnesium hydroxide ($Mg(OH)_2$), forming crystals in the water which may sediment in the system and clog downstream filtration units and membranes.

SUMMARY OF THE INVENTION

An object of the present invention is to provide a solution to the problems connected with scaling due to precipitation of by-products like calcium carbonate and magnesium hydroxide in seawater which is disinfected through electro-chlorination.

The object is met by a method and a subsea water treatment installation configured for feeding an electro-chlorinator with water coming from a filtration unit having a capacity to remove dissolved calcium ions $Ca^2$ and magnesium ions $Mg^2$ from the seawater before feeding the water to the electro-chlorinator.

More precisely, what is disclosed is a subsea installation adapted for treatment of raw seawater into process water suitable for use in subsea hydrocarbon production, the water treatment installation comprising: a seawater inlet to a primary filtration unit wherein a filtration membrane separates a receiving chamber from a permeate chamber having an outlet for treated water, a pump in fluid flow communication with the treated water outlet, a recirculation loop feeding a portion of the treated water via a subsea electro-chlorinator back to the water stream upstream or downstream of the membrane of the primary filtration unit, and a secondary filtration unit installed in the treated water stream between the primary filtration unit and the electro-chlorinator.

The primary filtration unit can be realized with different types of filtration membranes. In one embodiment, the primary filtration unit comprises a micro- or ultrafiltration membrane effective for removal of particulate material suspended in the water.

The primary filtration unit may in another embodiment comprise a membrane that is structured for through-put of solids not larger than 1 micron contained in the water.

The secondary filtration unit may likewise be realized in alternative embodiments. In one embodiment the secondary filtration unit comprises a membrane that is structured for through-put of solids not larger than 0.01 micron contained in the water.

In another embodiment the secondary filtration unit comprises a nano-filtration membrane effective for sulphate removal.

In yet another embodiment the secondary filtration unit comprises a reverse osmosis membrane effective for desalination.

In an embodiment the secondary filtration unit is installed in the recirculation loop and upstream of the electro-chlorinator.

In an embodiment of the water treatment installation the secondary filtration unit comprises a reverse osmosis (RO) unit having outlets for permeate and reject water, the reject water outlet feeding RO reject rich in NaCl and high in divalent ions to a nano-filtration (NF) unit having outlets for permeate and reject water, the permeate water outlet feeding NF permeate rich in NaCl and low in divalent ions to the electro-chlorinator.

An embodiment of the present invention analogously provides a method for scaling prevention in a water treatment subsea installation that is adapted for treatment of raw seawater into process water suitable for use in subsea hydrocarbon production. The method comprises feeding seawater in a treated water stream through a membrane for solids removal in a primary filtration step, feeding a portion of the treated water through a membrane for sulphate removal and/or desalination in a secondary filtration step downstream of the primary filtration step, generation of chlorine from the de-sulphated/desalinated water in an electro-chlorinator, and returning the chlorinated water to the water stream upstream or downstream of the membrane of the primary filtration step.

In one embodiment the method comprises removal of solids larger than 1 micron from the treated water in the primary filtration step.

In one embodiment the method comprises removal of solids larger than 0.01 micron from the treated water in the secondary filtration step.

In an embodiment of the method comprises: filtration of seawater in a micro- or ultrafiltration membrane, feeding the permeate from the micro- or ultrafiltration membrane for desalination through reverse osmosis, feeding the NaCl rich reject from the reverse osmosis for filtration in a nano-filtration membrane, feeding the NaCl rich permeate from the nano-filtration membrane for chlorine generation, returning the water containing chlorine to the micro- or ultrafiltration membrane.

Further advantages as well as advantageous features of the present invention will appear from the following description and the dependent claims.

BRIEF DESCRIPTION OF THE DRAWINGS

Embodiments of the invention will be explained below with reference made to the accompanying schematic drawings. In the drawings.

DETAILED DESCRIPTION OF THE INVENTION

Figure 1:
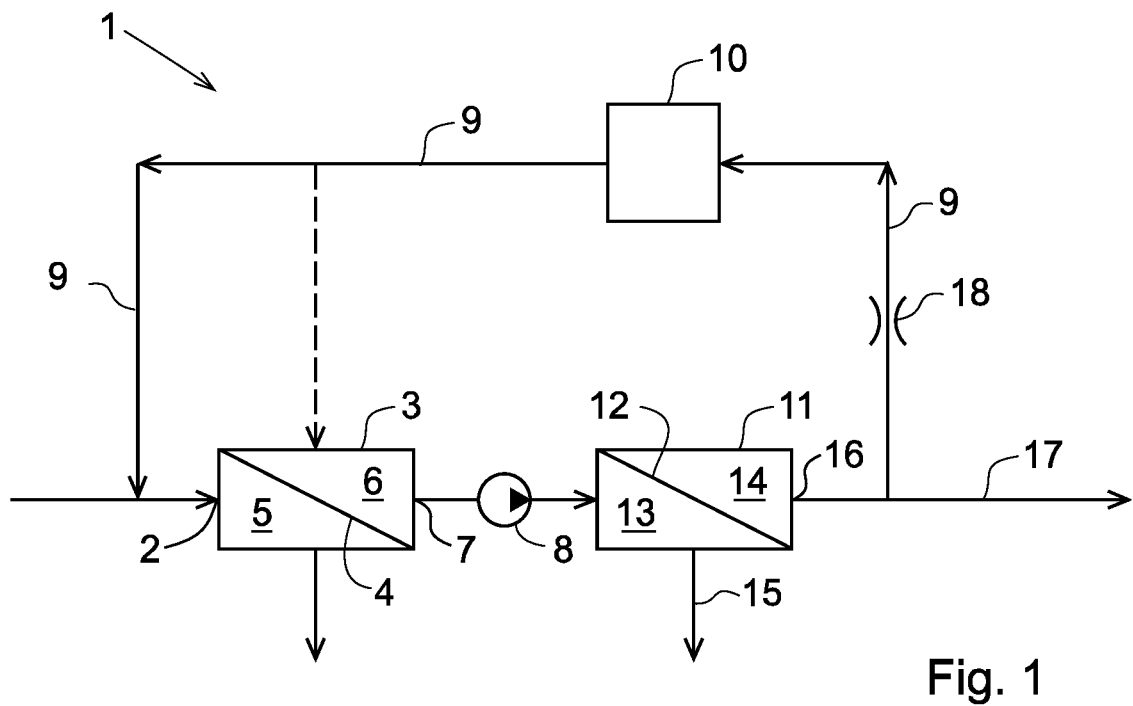
FIG. 1 shows a first configuration of a water treatment subsea installation designed for scaling prevention through removal of fine solid matter and sulphate removal and/or desalination of seawater.

With reference to FIG. 1, a water treatment subsea installation 1 comprises an inlet 2 feeding seawater to a primary filtration unit 3. The primary filtration unit 3 comprises a membrane 4 that separates a receiving chamber 5 from a permeate chamber 6 having an outlet 7 for permeate water. Transport of seawater through the primary filtration unit 3 is effected by means of a pump 8. A portion of the permeate water is throttled into a recirculation loop 9 and returned to the seawater stream via an electro-chlorinator 10. The recirculated water portion may be returned to the seawater upstream of membrane in the primary filtration unit 3 as illustrated in continuous lines, or may alternatively be returned to the permeate route/chamber 6 in the primary filtration unit 3, on the downstream side of the membrane 4 as illustrated through the broken line in FIG. 1. A retentate or reject from the primary filtration unit 3 can be discharged to the sea as illustrated through the arrow that points downward from the receiving chamber 5.

Upstream of the electro-chlorinator 10, a secondary filtration unit 11 is installed in the feed of water discharged from the primary filtration unit 3.

Whereas the primary filtration unit 3 is structured for fines removal comprising a micro-filtration or ultrafiltration membrane 4, the secondary filtration unit 11 may comprise a nano-filtration membrane 12 structured for sulphate removal.

In this connection it should be pointed out that the water supplied to the primary filtration unit 3 may be raw seawater or pre-treated seawater that has passed a coarse filtration unit (not shown) before entry in the primary filtration unit 3.

Because of the capacity of a nano-filtration membrane to remove divalent and reactive calcium and magnesium ions from the water to be supplied to the electro-chlorinator 10, the problem of scaling and deposition of calcium carbonate $CaCo_3$ and magnesium hydroxide $Mg(OH)_2$ crystals in the electro-chlorinator and in downstream filters and membranes will be substantially reduced or completely avoided.

Accordingly, the nano-filtration membrane 12 separates a receiving chamber 13 from a permeate chamber 14 in the secondary filtration unit 11. The receiving chamber 13 forms a reject water route in the secondary filtration unit 11 from where a nano-filtration retentate is discharged via reject water outlet 15. The permeate from the secondary filtration unit is discharged downstream via permeate water outlet 16 into the process water line 17. A portion of the treated water is routed to the electro-chlorinator 10 via a throttle valve 18, which can be adjustable, and installed in the recirculation loop 9.

Figure 2:
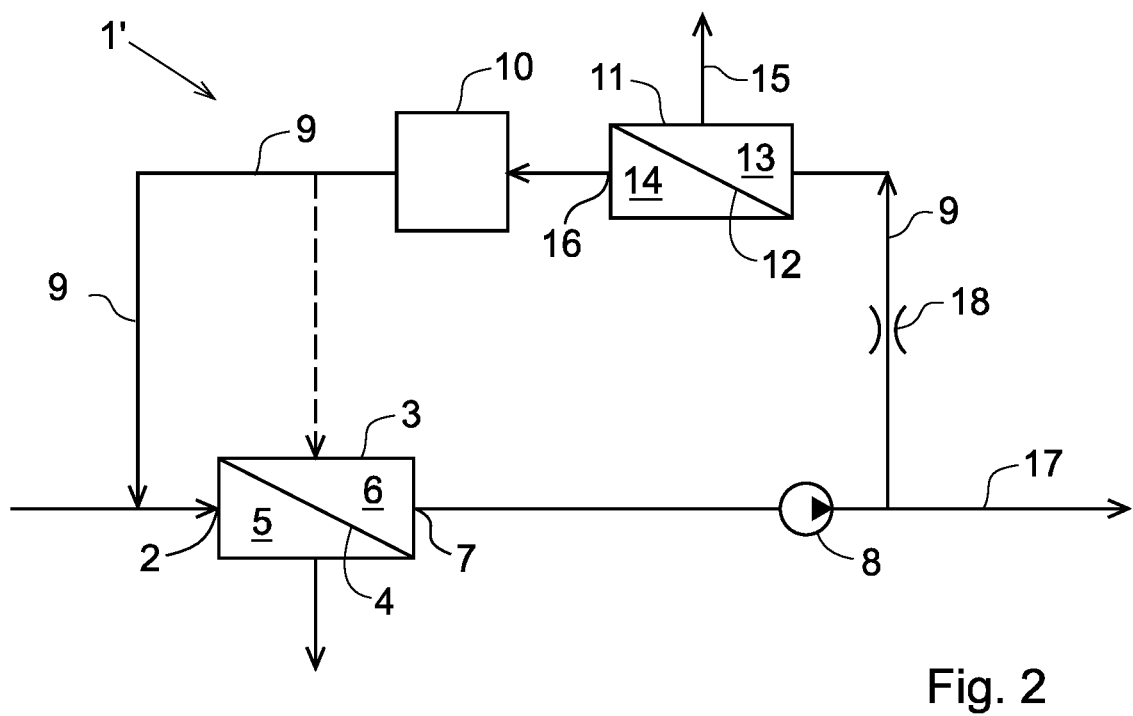
FIG. 2 shows a second configuration of a water treatment subsea installation designed for scaling prevention.

FIG. 2 shows an alternative embodiment 1' of the water treatment subsea installation. The embodiment of FIG. 2 comprises all the disclosed elements of the previous embodiment but differs therefrom with respect to the location of the secondary filtration unit 11. To be more precise, in the embodiment of FIG. 2 the secondary filtration unit 11 is disposed in the recirculation loop 9 upstream of the electro-chlorinator 10 and downstream of the primary filtration unit 3. The location of the secondary filtration unit 11 in the recirculation loop permits a reduction of dimensions and capacity for the secondary unit, since the volume for treatment by the secondary filtration unit will be only the re-circulated portion of the permeate passing through the primary filtration unit 3.

Figure 3:
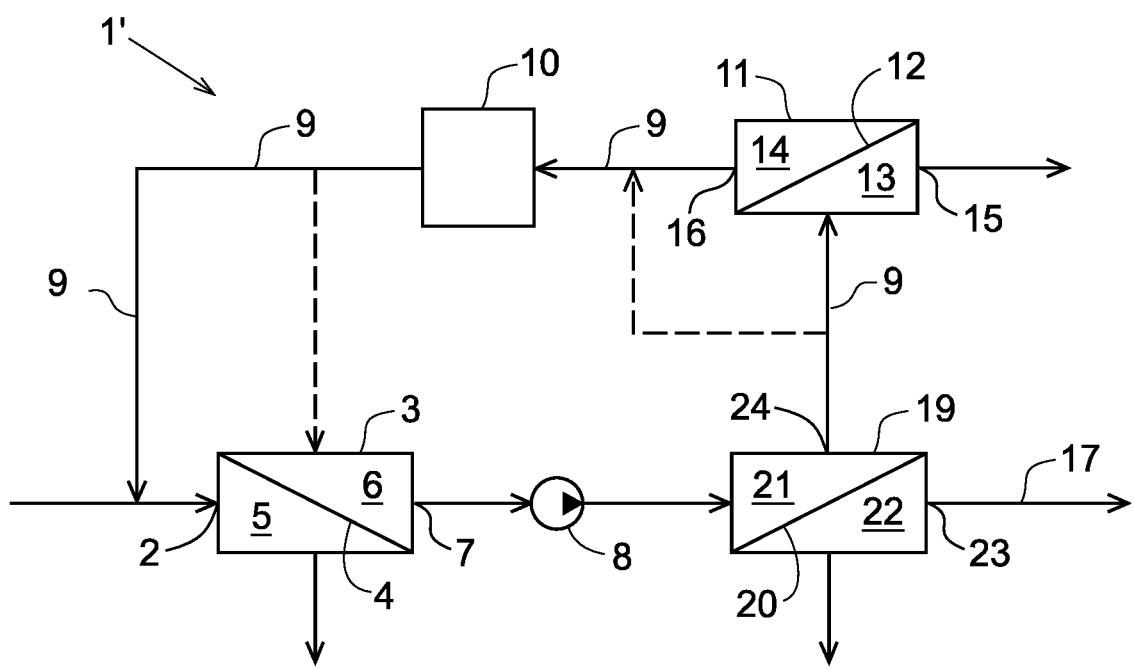
FIG. 3 shows a third configuration of a water treatment subsea installation designed for scaling prevention.

Yet an alternative embodiment 1″ of the water treatment subsea installation is shown in FIG. 3. The embodiment of FIG. 3 comprises all the major components of the embodiments of FIGS. 1 and 2. However, in the embodiment of FIG. 3, a reverse osmosis unit 19 is inserted in the treated water flow downstream of the primary filtration unit 3. The reverse osmosis unit 19 forms a secondary filtration unit located in the treated water flow downstream of the primary filtration unit 3 and upstream of the electro-chlorinator 10. In the reverse osmosis unit 19 a reverse osmosis membrane 20 separates a receiving chamber 21 from a permeate chamber 22. The permeate chamber 22 discharges desalinated water into the process water line 17 via a permeate water outlet 23.

The receiving chamber 21 forms a retentate route for treated water received from the primary filtration unit 3. The retentate from the reverse osmosis unit 19, rich in NaCl and with a low content of divalent ions, is discharged into the recirculation loop 9 via a reject water outlet 24 and supplied to the nano-filtration unit 11 which is installed in the recirculation loop. The NaCl rich nano-filtration permeate is fed via a permeate water outlet 16 to the electro-chlorinator 10, whereas the retentate from the nano-filtration unit 11 is discharged via the reject water outlet 15.

A scaling prevention effect is likewise achieved if alternatively the electro-chlorinator 10 is directly supplied the retentate from the reverse osmosis unit 19, thus by-passing or omitting a subsequent nano-filtration step, since the reject from the reverse osmosis unit, which has a high concentration of sodium chloride NaCl, also shows a low content of divalent and reactive calcium or magnesium ions. In FIG. 3, the alternative route is illustrated through dashed lines.

The secondary filtration step may thus alternatively comprise nano-filtration or reverse osmosis. The secondary filtration unit may accordingly be realized as a nano-filtration unit or as a reverse osmosis unit, and may as described above alternatively be realized as a reverse osmosis unit and a nano-filtration unit in combination.

The filters and membranes suitable for use in the primary and secondary filtration units can be conventional off-the shelf products, in an embodiment of the cross-flow filter type. Suitable micro filtration membranes, ultrafiltration membranes, nano-filtration membranes and reverse osmosis membranes are commercially available and therefore need no further specification, since a person skilled in the art of filtration and treatment of seawater has the knowledge and experience to choose a suitable membrane for each of the primary and secondary filtration units which are presented herein as elements of the present invention.

Although the present invention has been described with reference to highly schematic drawings it will be understood that modified embodiments of the water treatment subsea installation may be additionally equipped with valves etc. which may be supplied in order to control the routes of seawater and treated water through the water treatment installation, or pumps etc. which may be installed in order to apply the required pressure at different locations of the water treatment installation. Any such modification is however within the reach of the skilled person and shall be considered as included under the scope of protection defined in the accompanying claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A water treatment subsea installation adapted for treatment of raw seawater into process water suitable for use in subsea hydrocarbon production, the water treatment installation comprising:
 a seawater inlet to a primary filtration unit wherein a filtration membrane separates a receiving chamber from a permeate chamber having an outlet for treated water;
 a pump in fluid flow communication with the treated water outlet;
 a recirculation loop to feed a portion of the treated water via a subsea electro-chlorinator back to the water stream upstream or downstream of the membrane of the primary filtration unit; and
 a secondary filtration unit installed upstream of the electro-chlorinator, the secondary filtration unit comprising:
  a nano-filtration unit having a nano-filtration membrane effective for sulphate removal having an inlet and outlets for permeate and reject water; and
  a reverse osmosis unit having an inlet for receipt of the treated water and outlets for permeate and reject water;
  wherein the reject water outlet of the reverse osmosis unit feed a reverse osmosis reject that is rich in NaCl and high in divalent ions to the nano-filtration unit via the nano-filtration unit inlet; and
  wherein the permeate water outlet of the nano-filtration unit feed a nano-filtration permeate rich in NaCl and low in divalent ions to the electro-chlorinator.

2. The water treatment installation of claim 1, wherein the primary filtration unit comprises a micro- or ultrafiltration membrane effective for particulate removal.

3. The water treatment installation of claim 1, wherein the primary filtration unit comprises a membrane structured for through-put of solids not larger than 1 micron contained in the water.

4. The water treatment installation of claim 3, wherein the secondary filtration unit comprises a reverse osmosis membrane effective for desalination.

5. The water treatment installation of claim 1, wherein the secondary filtration unit comprises a membrane structured for through-put of solids not larger than 0.01 micron contained in the water.

6. A method for scaling prevention in a water treatment subsea installation adapted for treatment of raw seawater into process water suitable for use in subsea hydrocarbon production, the method comprising:
 feeding seawater through a membrane for solids removal in a primary filtration step to provide treated water;

feeding a portion of the treated water through a reverse osmosis unit including a reverse osmosis membrane and successively through a nano-filtration unit including a nano-filtration membrane for sulphate removal to provide a de-sulphated reverse osmosis (RO) concentrate in a secondary filtration step downstream of the primary filtration step;

feeding an NaCl rich reject from the reverse osmosis unit for filtration in the nano-filtration membrane;

feeding an NaCl rich permeate from the nano-filtration membrane for chlorine generation to a subsea electro-chlorinator downstream of the nano-filtration membrane;

generating chlorine from the de-sulphated RO concentrate in the subsea electro-chlorinator; and returning the chlorinated water to the treated water stream upstream or downstream of the membrane of the primary filtration step.

7. The method of claim 6, wherein the primary filtration step comprises removal of solids larger than 1 micron from the treated water.

8. The method of claim 6, wherein the secondary filtration step comprises removal of solids larger than 0.01 micron from the treated water.

* * * * *